United States Patent
Ko et al.

(10) Patent No.: US 11,942,889 B2
(45) Date of Patent: Mar. 26, 2024

(54) MOTOR CONTROL DEVICE

(71) Applicant: Hitachi Astemo, Ltd., Hitachinaka (JP)

(72) Inventors: Shinyu Ko, Hitachinaka (JP); Kohei Myoen, Hitachinaka (JP); Eigo Kishimoto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 336 days.

(21) Appl. No.: 17/417,311

(22) PCT Filed: Dec. 12, 2019

(86) PCT No.: PCT/JP2019/048612
§ 371 (c)(1),
(2) Date: Jun. 22, 2021

(87) PCT Pub. No.: WO2020/137567
PCT Pub. Date: Jul. 2, 2020

(65) Prior Publication Data
US 2022/0077795 A1 Mar. 10, 2022

(30) Foreign Application Priority Data
Dec. 28, 2018 (JP) ................................ 2018-247785

(51) Int. Cl.
*H02P 6/08* (2016.01)
*B60L 15/20* (2006.01)
(Continued)

(52) U.S. Cl.
CPC ............... *H02P 6/08* (2013.01); *B60L 15/20* (2013.01); *B60L 53/20* (2019.02); *B60L 58/12* (2019.02);
(Continued)

(58) Field of Classification Search
CPC .... H02P 6/08; H02P 2205/01; H02P 2205/05; H02P 23/20; H02P 27/08; B60L 15/20;
(Continued)

(56) References Cited

U.S. PATENT DOCUMENTS 7,960,930 B2 * 6/2011 Sato ...................... B60L 15/025
318/599
7,990,093 B2 * 8/2011 Kezobo ................. H02P 29/032
318/803

(Continued)

FOREIGN PATENT DOCUMENTS

| JP | 2009-131043 A | 6/2009 |
| JP | 2010-035396 A | 2/2010 |
| JP | 2016-113111 A | 6/2016 |

OTHER PUBLICATIONS

International Search Report with English translation and Written Opinion issued in corresponding application No. PCT/JP2019/048612 dated Mar. 17, 2020.

*Primary Examiner* — David Luo
(74) *Attorney, Agent, or Firm* — Foley & Lardner LLP

(57) ABSTRACT

A first torque calculation unit 114 calculates torque TQ_DC currently generated by a motor 106 based on a DC current DC1. A second torque calculation unit 115 calculates torque TQ_UVW currently generated by the motor 106 based on U-phase, V-phase, and W-phase currents. A torque limit calculation unit 116 calculates a torque limit TQ_LMT1 using a torque limit characteristic map measured in advance based on a current limit DC_LMT1. A torque limit correction unit 117 compares first torque TQ_DC with second torque TQ_UVW to calculate a torque variation degree KP1. Then, the torque limit TQ_LMT1 is corrected using the variation degree KP1 to calculate a torque limit TQ_LMT2. As a result, even if required torque reaches the torque limit, the DC current does not exceed the current limit, and the
(Continued)

output of the motor can be fully utilized by approaching the current limit.

10 Claims, 11 Drawing Sheets

(51) Int. Cl.
*B60L 53/20* (2019.01)
*B60L 58/12* (2019.01)
*B60L 58/18* (2019.01)

(52) U.S. Cl.
CPC ......... *B60L 58/18* (2019.02); *B60L 2240/421* (2013.01); *B60L 2240/423* (2013.01)

(58) Field of Classification Search
CPC .......... B60L 53/20; B60L 58/12; B60L 58/18; B60L 2240/421; B60L 2240/423; B60L 2240/549; B60L 2250/28; B60L 3/0046; B60L 15/08; Y02T 10/64; Y02T 90/14; Y02T 10/62; Y02T 10/70; Y02T 10/7072; Y02T 10/72
USPC ........................ 318/139, 400.15, 400.01, 700
See application file for complete search history.

(56) References Cited

U.S. PATENT DOCUMENTS

| | | | |
|---|---|---|---|
| 8,232,756 B2 * | 7/2012 | Yoshihara | G05B 9/02 318/434 |
| 2009/0133947 A1 | 5/2009 | Yoshihara | |

* cited by examiner

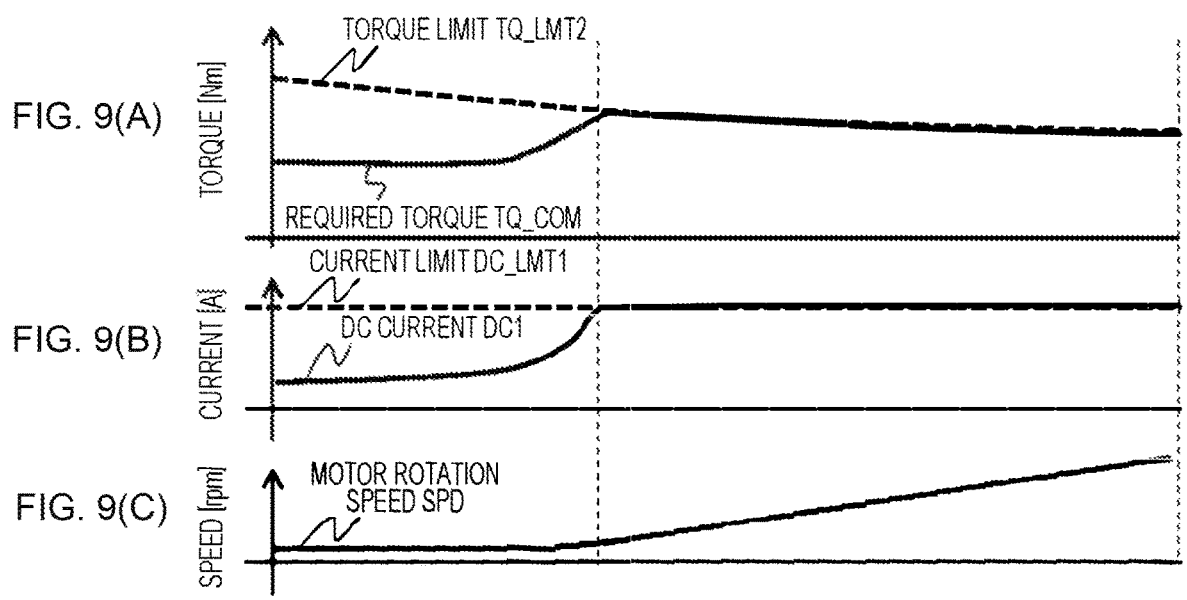

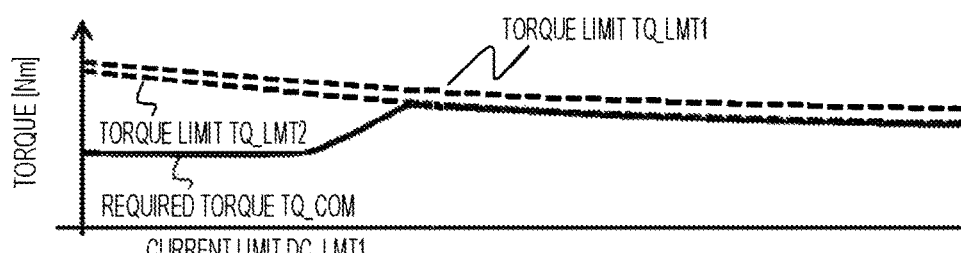
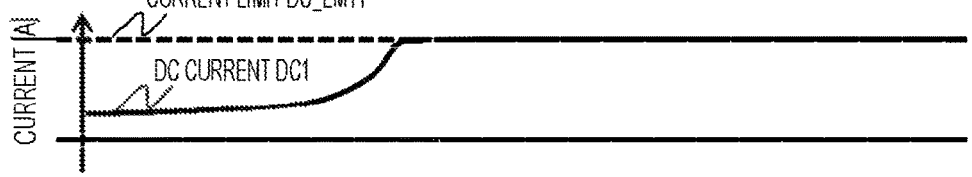
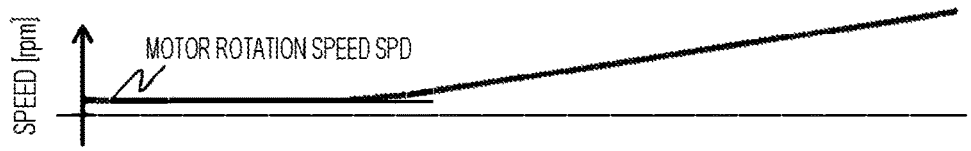

MOTOR CONTROL DEVICE

TECHNICAL FIELD

The present invention relates to a motor control device.

BACKGROUND ART

An electric vehicle, such as a hybrid system, includes a secondary battery, an inverter, and a motor. The motor is used for engine cranking, vehicle acceleration, and regeneration assistance. The secondary battery supplies a DC current to the motor and recovers electric power. Then, a motor control unit calculates a torque limit that the motor can output based on a current limit of the secondary battery in order to protect the secondary battery. On the other hand, when required torque determined based on accelerator opening information by a driver reaches a torque limit that can be output by the motor, the DC current is controlled so as not to exceed the current limit by the torque limit.

PTL 1 describes that estimated torque is calculated based on U-phase, V-phase, and W-phase currents output from an inverter and a motor angle, and that a torque output by a motor is calculated based on a voltage and a current input from a secondary battery.

CITATION LIST

Patent Literature

PTL 1: JP 2009-131043 A

SUMMARY OF INVENTION

Technical Problem

Conventionally, a DC current sometimes exceeds a current limit even if a required torque reaches a torque limit.

Solution to Problem

A motor control device according to the present invention includes: an inverter which supplies U-phase, V-phase, and W-phase currents to a motor; a torque limit calculation unit which calculates a torque limit from a current limit of a secondary battery that supplies a DC current to the inverter; a first torque calculation unit which calculates a first torque based on the DC current supplied to the inverter; a second torque calculation unit which calculates a second torque based on the U-phase, V-phase, and W-phase currents; and a torque limit correction unit which corrects the torque limit using the first torque and the second torque.

Advantageous Effects of Invention

According to the present invention, even if the required torque reaches the torque limit, the DC current does not exceed the current limit, and the output of the motor can be fully utilized by approaching the current limit.

BRIEF DESCRIPTION OF DRAWINGS

FIGS. 9(A) to 9(C) are graphs illustrating characteristics of the motor control device according to the present embodiment.

FIGS. 10(A) to 10(E) are graphs illustrating detailed characteristics of the motor control device according to the present embodiment.

DESCRIPTION OF EMBODIMENTS

Comparative Example

Before describing the present embodiment, a comparative example for comparison with the present embodiment will be described with reference to FIGS. 1 and 2.

Figure 1:
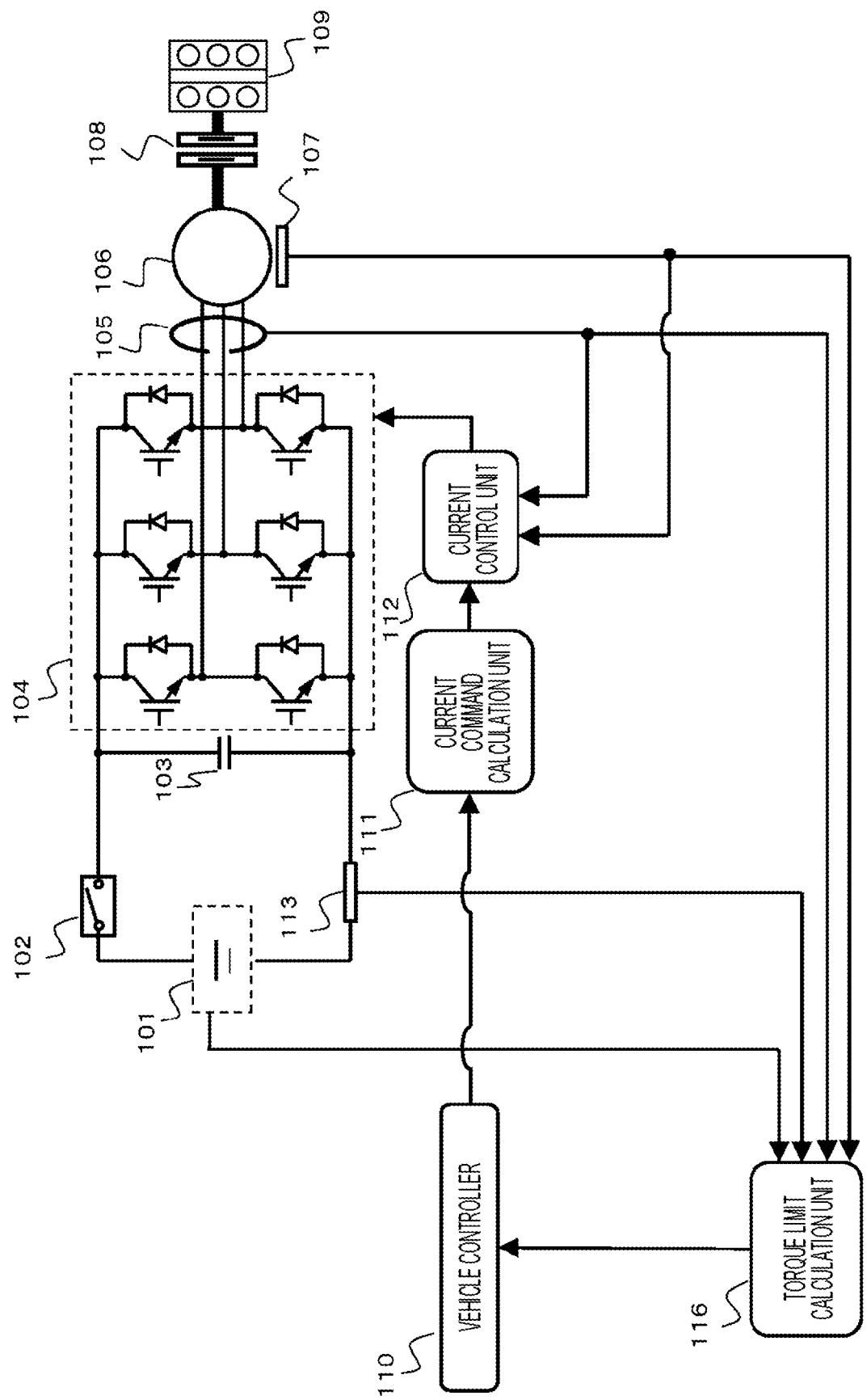
FIG. 1 is a configuration diagram of a motor control device according to a comparative example.
Figure 2:
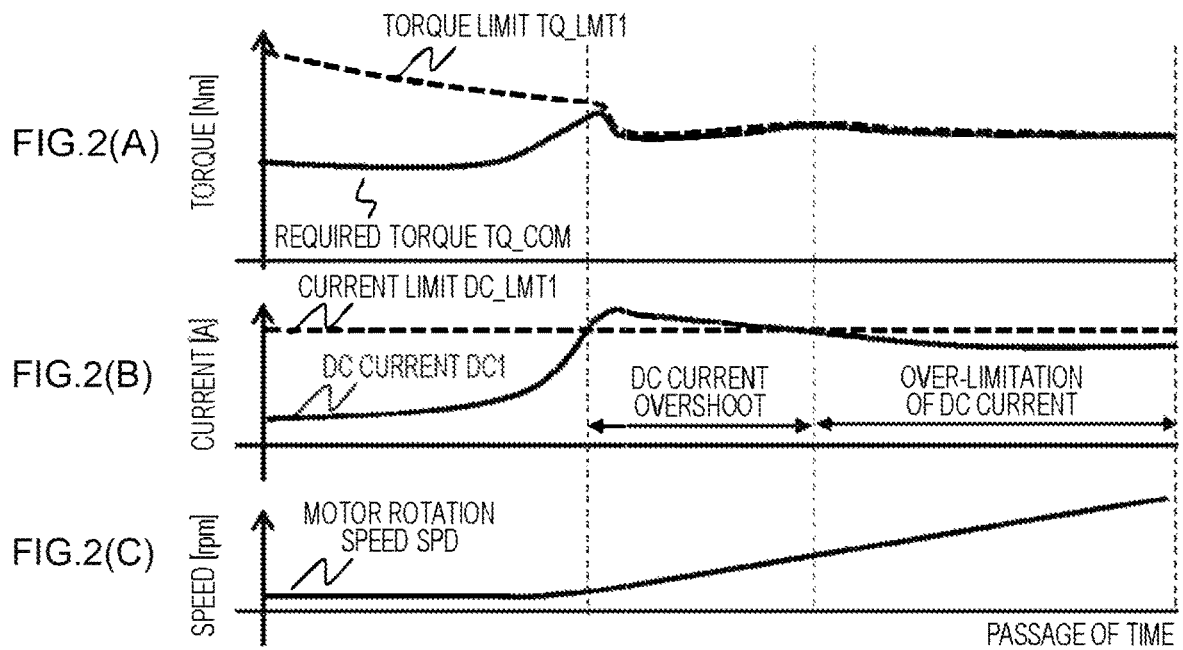
FIGS. 2(A) to (C) are graphs illustrating characteristics of the motor control device according to the comparative example.

FIG. 1 is a configuration diagram of a motor control device in a case where the present embodiment is not applied. This motor control device is used by being mounted on a vehicle that is a hybrid electric vehicle. As a secondary battery 101, a nickel hydrogen secondary battery, a lithium ion secondary battery, or the like is used. The secondary battery 101 calculates an available current limit DC_LMT1 from a temperature and a remaining capacity. A DC current sensor 113 detects a DC current IDC1 of an inverter 104 to be described later. Further, the secondary battery 101 has a built-in DC voltage sensor and detects a DC voltage HVDC output from the secondary battery 101. The current limit DC_LMT1, the detected DC current DC1, and the DC voltage HVDC are input to a torque limit calculation unit 116 to be described later.

The contactor 102 is arranged between the secondary battery 101 and the inverter 104. When the contactor 102 is turned off, the secondary battery 101 and the inverter 104 are electrically cut off. When the contactor 102 is turned on, the secondary battery 101 and the inverter 104 are electrically connected, and the power of the secondary battery 101 is supplied to the inverter 104.

A smoothing capacitor 103 smoothens an input voltage of the inverter 104. The inverter 104 is connected to the smoothing capacitor 103 on a DC side and is connected to a stator of a motor 106 on a three-phase AC side. The inverter 104 uses a switching element to convert a DC voltage and an AC voltage to each other.

A phase current detector 105 is connected to UVW phases between an AC side of the inverter 104 and the motor 106 to detect U-phase, V-phase, and W-phase currents. The motor 106 generates torque according to the U-phase, V-phase, and W-phase currents output from the inverter 104 in response to acceleration and deceleration of the vehicle or a torque command for cranking. The torque generated by the motor 106 is used for cranking an engine 109 and acceleration and regeneration assistance of the vehicle.

An angle sensor 107 detects a rotor angle of the motor 106 and calculates a motor speed SPD. The angle sensor 107 is, for example, a resolver or the like. A clutch 108 is arranged between the motor 106 and the engine 109. The motor 106 and the engine 109 are mechanically cut off when the clutch 108 is turned off, and the motor 106 and the engine 109 are mechanically connected when the clutch 108 is turned on. When the clutch 108 is turned on after an ignition key is turned on or when an accelerator operates, the motor 106 cranks the engine 109. The engine 109 generates a driving force that causes the vehicle to travel.

The torque limit calculation unit 116 calculates a torque limit TQ_LMT1 based on the current limit DC_LMT1 from the secondary battery 101, the DC current DC1 detected by the DC current sensor 113, the U-phase, V-phase, and W-phase currents output from the inverter 104, and a rotation speed of the motor 106.

The vehicle controller 110 is a host controller that transmits a torque command value TQ1 for acceleration and deceleration or cranking. The vehicle controller 110 calculates the torque command value TQ1 with the torque limit TQ_LMT1 received from the torque limit calculation unit 116 as an upper limit.

The current command calculation unit 111 calculates a current command and a current phase command based on the torque command value TQ1. The current control unit 112 generates a PWM signal based on the current command, the current phase command, detection values of the U-phase, V-phase, and W-phase currents, and motor rotor angle information.

FIGS. 2(A) to (C) are graphs illustrating characteristics of the motor control device in the case where the present embodiment is not applied. FIG. 2(A) illustrates the torque of the motor, FIG. 2(B) illustrates the DC current DC1, FIG. 2(C) illustrates the rotation speed of the motor, and all horizontal axes represent the elapsed time.

As described above with reference to FIG. 1, the secondary battery 101 calculates the available current limit DC_LMT1 from the temperature and the remaining capacity. The torque limit calculation unit 116 calculates the torque limit TQ_LMT1 based on the current limit DC_LMT1. Here, when required torque TQ_COM determined based on accelerator opening information by a driver reaches the torque limit TQ_LMT1 as illustrated in FIG. 2(A), the following problems are likely to occur. First, the DC current DC1 overshoots beyond the current limit DC_LMT1 as illustrated in FIG. 2(B). Second, even if the required torque TQ_COM reaches the torque limit TQ_LMT1, the DC current DC1 becomes less than the current limit DC_LMT1 (over-limitation of DC current) with the passage of time as illustrated in FIG. 2(B) so that it is difficult to fully utilize the output of the motor 106.

According to the present embodiment described below, even if the required torque TQ_COM reaches the torque limit TQ_LMT1, the DC current DC1 does not exceed the current limit DC_LMT1, and then, the DC current DC1 approaches the current limit DC_LMT1 so that the output of the motor 106 can be fully utilized.

Embodiment

Figure 3:
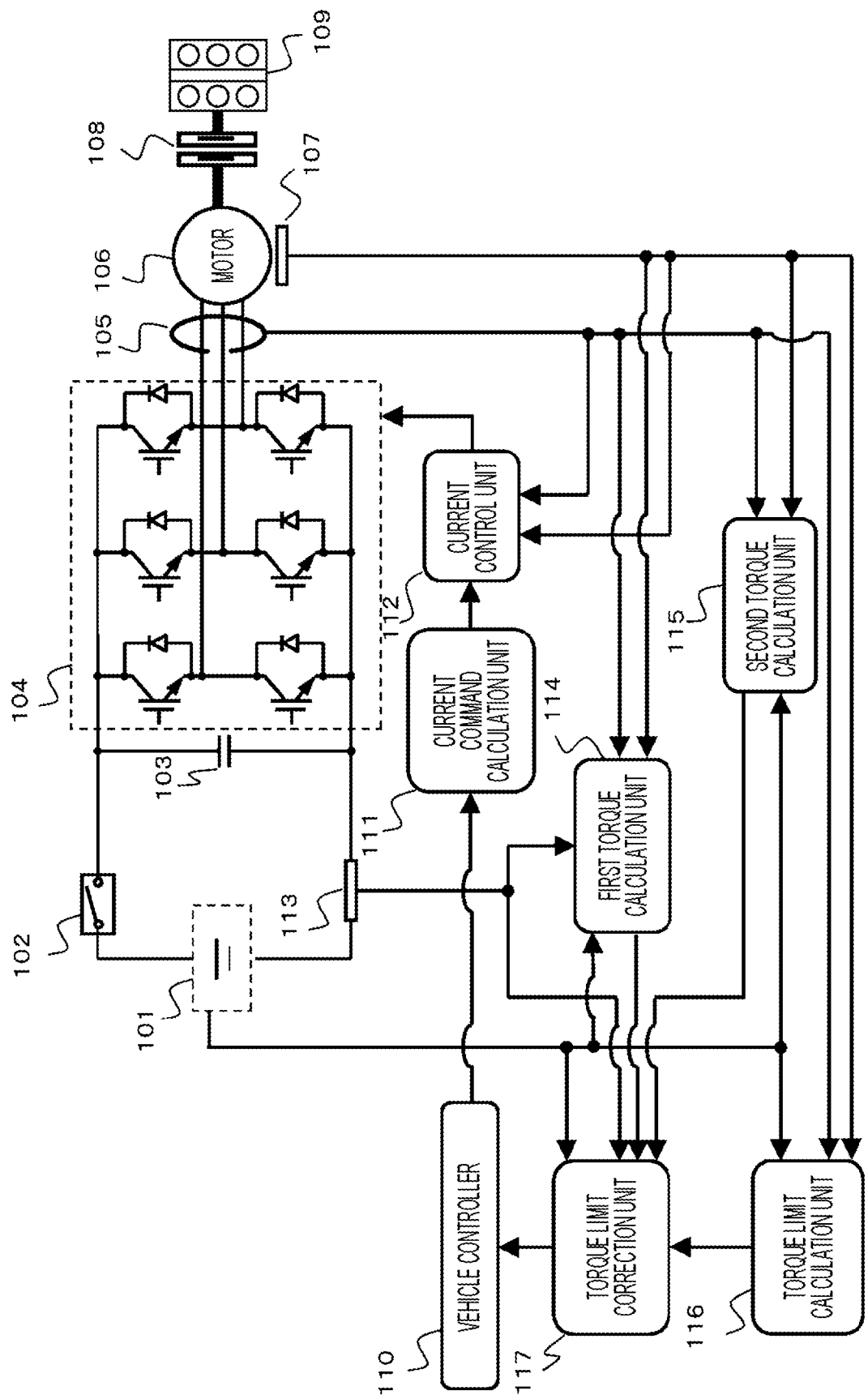
FIG. 3 is a configuration diagram of a motor control device according to the present embodiment.

FIG. 3 is a configuration diagram of a motor control device according to the present embodiment. The same parts as those in the comparative example illustrated in FIG. 1 will be denoted by the same reference signs, and the description thereof will be omitted. This motor control device is also used by being mounted on a vehicle that is a hybrid electric vehicle similarly to the comparative example. In the present embodiment, a first torque calculation unit 114, a second torque calculation unit 115, and a torque limit correction unit 117 are newly provided.

The first torque calculation unit 114 receives inputs of a current limit DC_LMT1 from a secondary battery 101, a DC current IDC1 from a DC current sensor 113, U-phase, V-phase, and W-phase currents from a phase current detector 105, and a motor speed SPD from an angle sensor 107. The first torque calculation unit 114 calculates first torque TQ_DC currently generated by a motor 106 based on the DC current DC1 using a calculation method similar to a torque limit calculation unit 116, which will be described later, and outputs the first torque TQ_DC to the torque limit correction unit 117.

The second torque calculation unit 115 receives inputs of the current limit DC_LMT1 from the secondary battery 101, the U-phase, V-phase, and W-phase currents from the phase current detector 105, and the motor speed SPD from the angle sensor 107. The second torque calculation unit 115 calculates second torque TQ_UVW currently generated by the motor 106 based on the U-phase, V-phase, and W-phase currents, and outputs the second torque TQ_UVW to the torque limit correction unit 117.

The torque limit calculation unit 116 uses a torque limit characteristic map of "current limit and torque limit" measured in advance to calculate a torque limit TQ_LMT1 based on the current limit DC_LMT1 as will be described later.

The torque limit correction unit 117 receives inputs of the current limit DC_LMT1 from the secondary battery 101, the DC current DC1 from the DC current sensor 113, the first torque TQ_DC from the first torque calculation unit 114, and the second torque TQ_UVW from the second torque calculation unit 115. The torque limit correction unit 117 compares the first torque TQ_DC from the first torque calculation unit 114 with the second torque TQ_UVW from the second torque calculation unit 115 to calculate a variation degree KP1 of the first torque calculation unit 114. Then, the torque limit correction unit 117 corrects the torque limit TQ_LMT1 using the variation degree KP1 and calculates a torque limit TQ_LMT2.

Figure 4A:
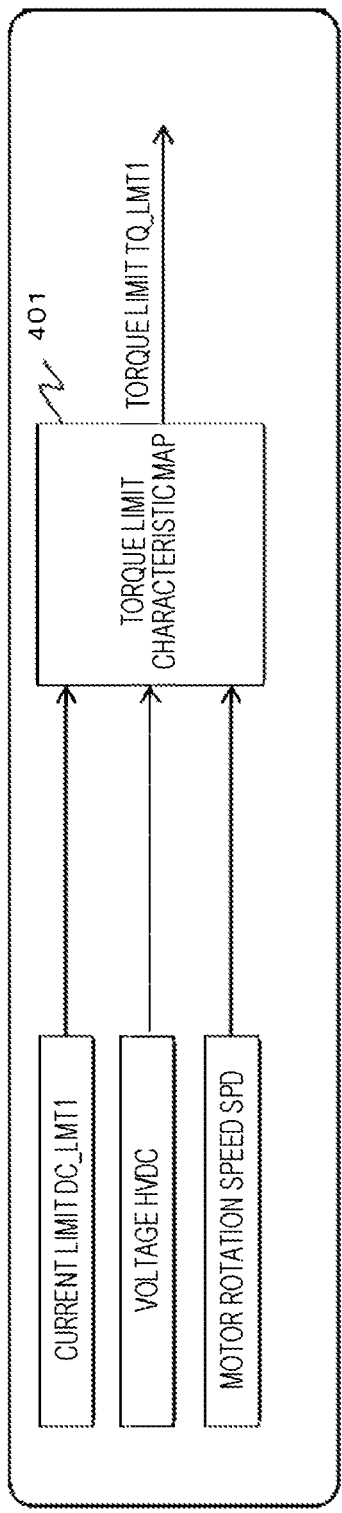
FIGS. 4(A) and 4(B) are views illustrating Example 1 of a torque limit calculation unit.
Figure 4B:
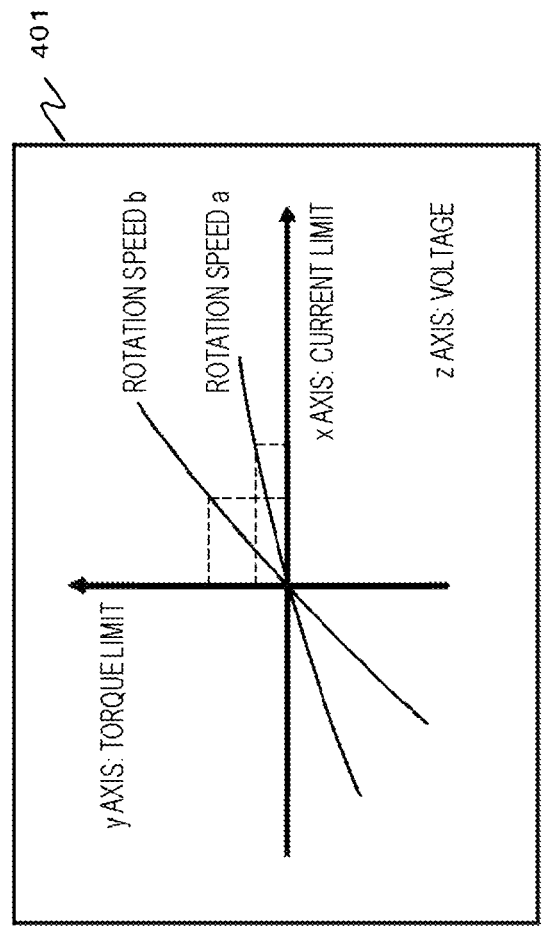
Figure 5A:
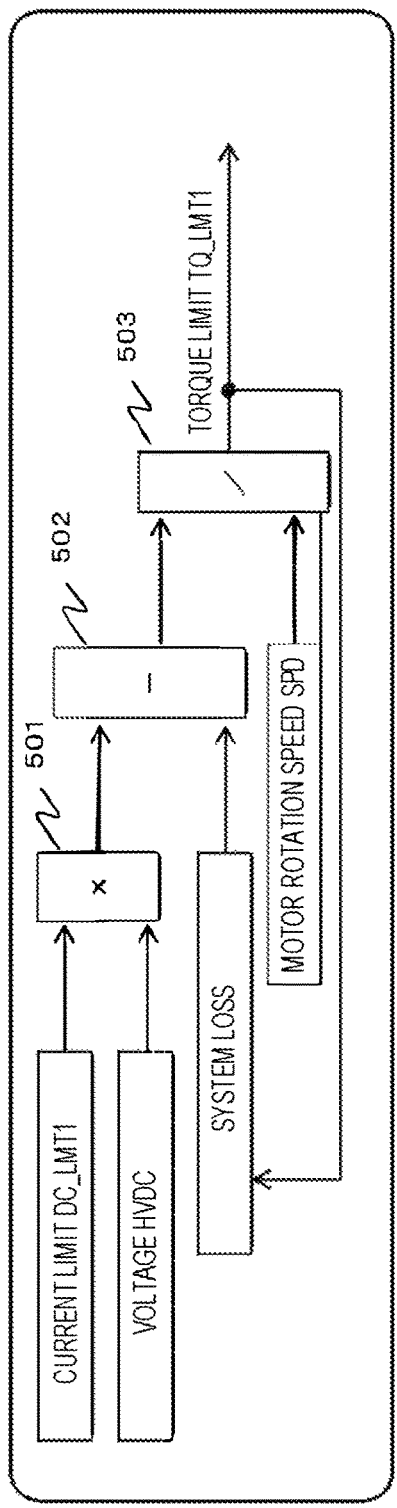
FIGS. 5(A) and 5(B) are views illustrating Example 2 of the torque limit calculation unit.
Figure 5B:
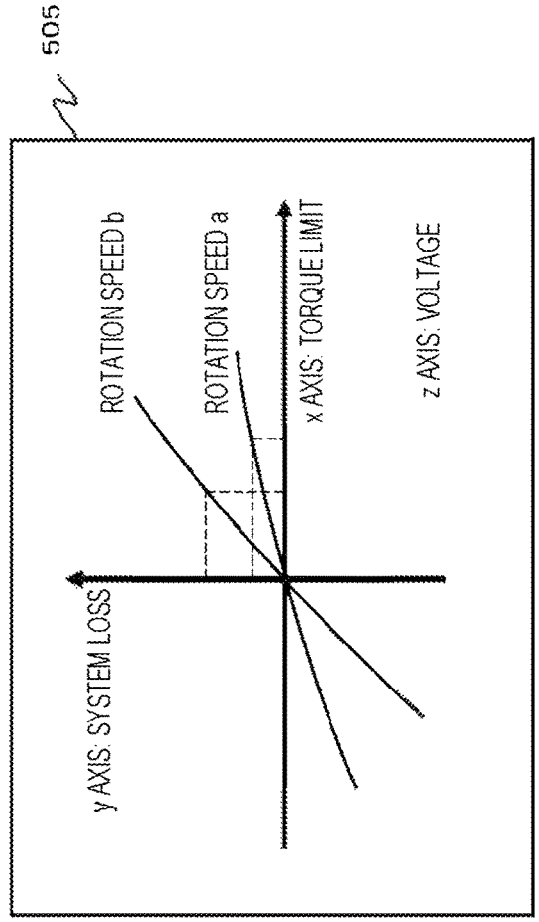
Figure 6A:
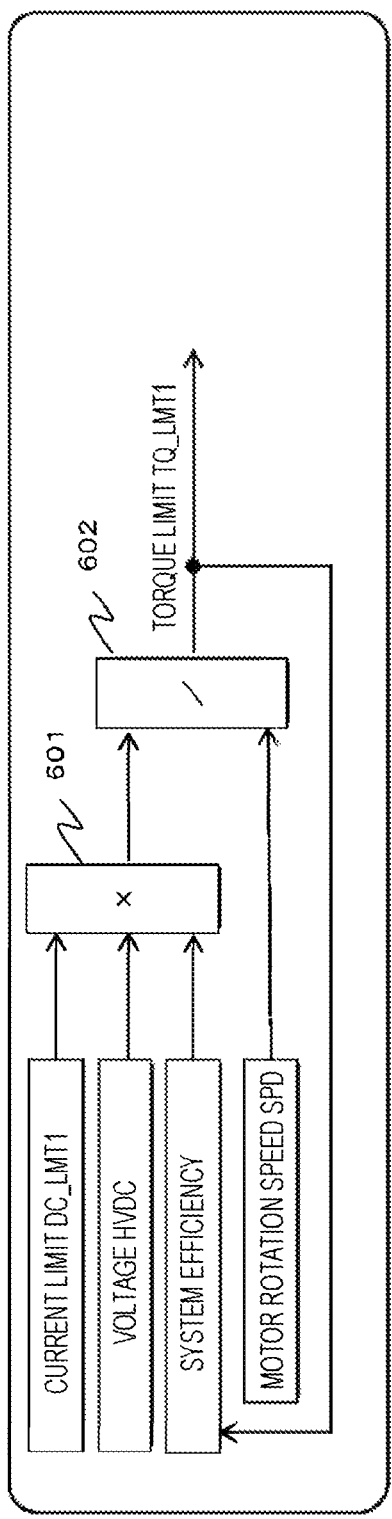
FIGS. 6(A) and 6(B) are views illustrating Example 3 of the torque limit calculation unit.
Figure 6B:
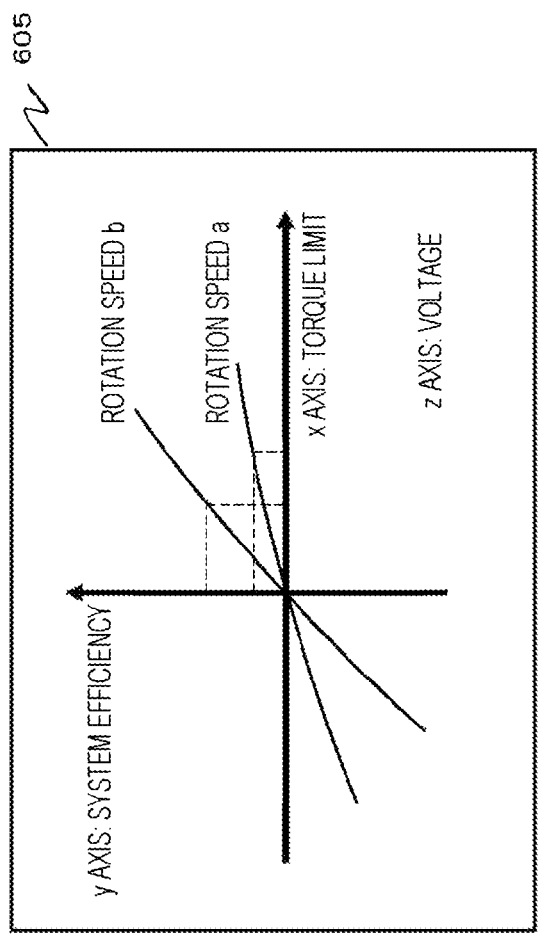

Next, details of the torque limit calculation unit 116 will be described. FIGS. 4(A) and 4(B) illustrate Example 1 of the torque limit calculation unit 116, FIGS. 5(A) and 5(B) illustrate Example 2 of the torque limit calculation unit 116, and FIGS. 6(A) and 6(B) illustrate Example 3 of the torque limit calculation unit 116. The torque limit calculation unit 116 may have any of configurations of Examples 1 to 3.

Example 1 of the torque limit calculation unit 116 will be described with reference to FIGS. 4(A) and 4(B). FIG. 4(A) is a view illustrating the configuration of Example 1 of the torque limit calculation unit 116. FIG. 4(B) is a view illustrating a torque limit characteristic map 401 in Example 1 of the torque limit calculation unit 116.

In FIG. 4(A), the current limit DC_LMT1 is an available DC limit value calculated from a temperature and a remaining capacity of the secondary battery 101. A voltage HVDC is a voltage from a DC voltage sensor of the secondary battery 101. The motor rotation speed SPD is a rotation speed of the motor calculated from the angle sensor 107. The torque limit characteristic map 401 illustrated in FIG. 4(B) is a map illustrating the relationship between the "current limit and torque limit" measured in an experiment. As illustrated in FIG. 4(B), an x axis represents the current limit DC_LMT1, a y axis represents the torque limit TQ_LMT1, and a z axis represents the voltage HVDC. Note that a graph on the z axis is omitted, but the relationship between the current limit DC_LMT1 on the x axis and the torque limit TQ_LMT1 on the y axis illustrated in FIG. 4(B) is defined according to the motor rotation speed SPD (rotation speeds a, b, and so on) for each value of the voltage HVDC. The torque limit calculation unit 116 can obtain a specific torque limit TQ_LMT1 from the y axis for a specific motor rotation speed SPD when a value on the z axis is determined according to the voltage HVDC and the current limit DC_LMT1 is input to the x axis.

Example 2 of the torque limit calculation unit 116 will be described with reference to FIGS. 5(A) and 5(B). FIG. 5(A) is a view illustrating the configuration of Example 2 of the torque limit calculation unit 116. FIG. 5(B) is a view illustrating a system loss characteristic map 505 of "torque limit and system loss".

The torque limit calculation unit 116 multiplies the current limit DC_LMT1 and the voltage HVDC using a multiplier 501, subtracts a system loss from a result of the multiplication using a subtractor 502, and divides a result of the subtraction by the motor rotation speed SPD using a divider 503, thereby obtaining the torque limit TQ_LMT1.

The system loss is obtained using the system loss characteristic map 505 of the "torque limit and system loss" illustrated in FIG. 5(B). In FIG. 5(B), an x axis represents the torque limit TQ_LMT1, a y axis represents the system loss, and a z axis represents the voltage HVDC. Note that a graph on the z axis is omitted, but the relationship between the torque limit TQ_LMT1 on the x axis and the system loss on the y axis illustrated in FIG. 5(B) is defined according to the motor rotation speed SPD (rotation speed a, b, and so on) for each value of the voltage HVDC. When a value on the z axis is determined according to the voltage HVDC and the previously calculated torque limit TQ_LMT1 is input to the x-axis, it is possible to obtain a specific system loss from the y axis for a specific motor rotation speed SPD.

Example 3 of the torque limit calculation unit 116 will be described with reference to FIGS. 6(A) and 6(B). FIG. 6(A) is a view illustrating the configuration of Example 3 of the torque limit calculation unit 116. FIG. 6(B) is a view illustrating a system efficiency characteristic map 605 of "torque limit and system efficiency".

The torque limit calculation unit 116 multiplies the current limit DC_LMT1, the voltage HVDC, and the system efficiency using a multiplier 601, and divides a result of the multiplication by the motor rotation speed SPD using a divider 602, thereby obtaining the torque limit TQ_LMT1.

The system efficiency is obtained using a system efficiency characteristic map 605 of "torque limit and system efficiency" illustrated in FIG. 6(B). In FIG. 6(B), an x axis represents the torque limit TQ_LMT1, a y axis represents the system efficiency, and a z axis represents the voltage HVDC. Note that a graph on the z axis is omitted, but the relationship between the torque limit TQ_LMT1 on the x axis and the system efficiency on the y axis illustrated in FIG. 6(B) is defined according to the motor rotation speed SPD (rotation speed a, b, and so on) for each value of the voltage HVDC. When a value on the z axis is determined according to the voltage HVDC and the previously calculated torque limit TQ_LMT1 is input to the x-axis, it is possible to obtain a specific system efficiency from the y axis for a specific motor rotation speed SPD.

Figure 7A:
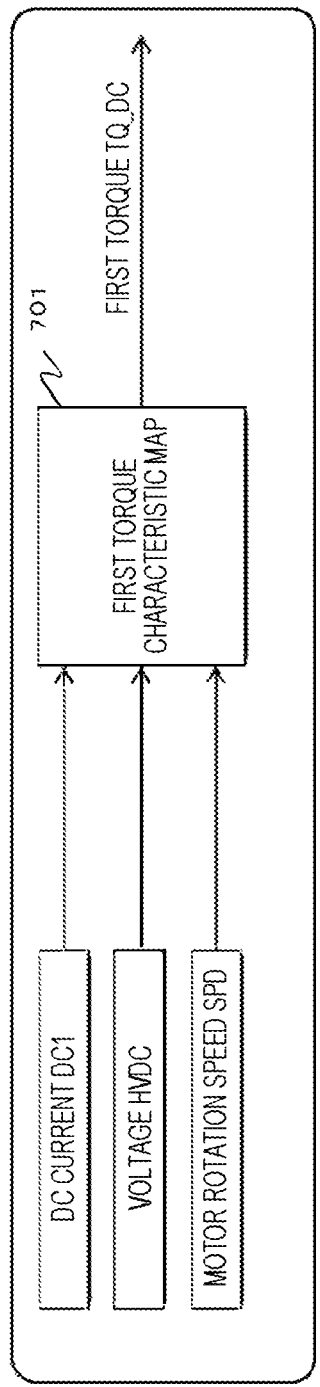
FIGS. 7(A) to 7(C) are views illustrating configurations of Examples 1 to 3 of a first torque calculation unit.
Figure 7B:
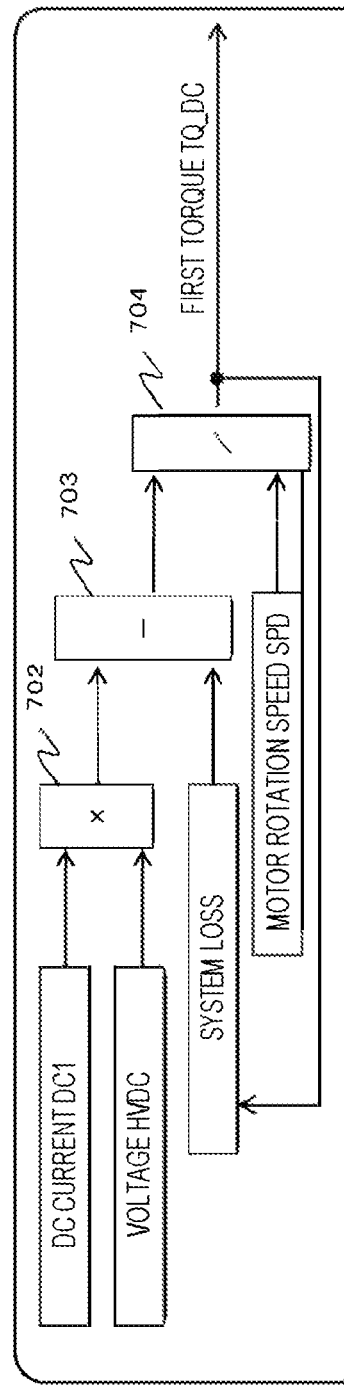
Figure 7C:
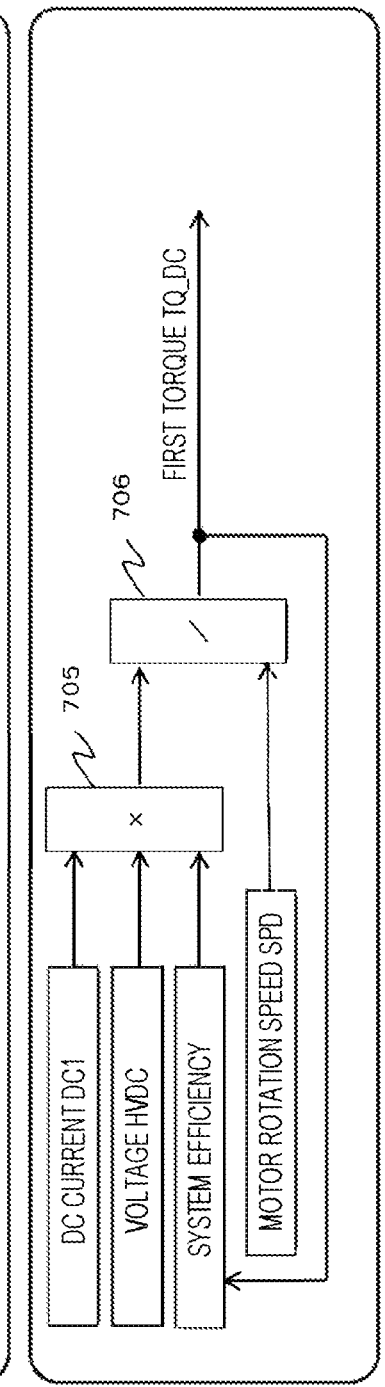

Next, the first torque calculation unit 114 will be described. FIG. 7(A) illustrates Example 1 of the first torque calculation unit 114, FIG. 7(B) illustrates Example 2 of the first torque calculation unit 114, and FIG. 7(C) illustrates Example 3 of the first torque calculation unit 114. The first torque calculation unit 114 may have any of configurations of Examples 1 to 3.

Example 1 of the first torque calculation unit 114 will be described with reference to FIG. 7(A). FIG. 7(A) is a view illustrating the configuration of Example 1 of the first torque calculation unit 114. In FIG. 7(A), the DC current DC1 is a current value detected by the DC current sensor 113 and is a current value input to an inverter 104. A voltage HVDC is a voltage from a DC voltage sensor of the secondary battery 101. The motor rotation speed SPD is a rotation speed of the motor calculated from the angle sensor 107. A first torque characteristic map 701 is not illustrated, but is similar to the torque limit characteristic map 401 illustrated in FIG. 4(B). That is, the current limit of the torque limit characteristic map 401 illustrated in FIG. 4(B) is replaced with the DC current DC1 in the first torque characteristic map 701 of this example. Further, the torque limit of the torque limit characteristic map 401 illustrated in FIG. 4(B) is replaced with the first torque TQ_DC. Then, the first torque characteristic map 701 illustrating the relationship between the "DC current DC1 and first torque" measured in an experiment is set in advance. As a result, the first torque calculation unit 114 can obtain specific first torque TQ_DC from the y axis for a specific motor rotation speed SPD when the value on the z axis is determined according to the voltage HVDC and the DC current DC1 is input to the x axis.

Example 2 of the first torque calculation unit 114 will be described with reference to FIG. 7(B). FIG. 7(B) is a view illustrating the configuration of Example 2 of the first torque calculation unit 114. The configuration of Example 2 of the first torque calculation unit 114 is similar to that of the torque limit calculation unit 116 illustrated in FIGS. 5(A) and 5(B). Although the current limit DC_LMT1 is used in Example 2 of the torque limit calculation unit 116, but the DC current DC1 is used instead of the current limit DC_LMT1 in this example, which is a difference. The first torque calculation unit 114 multiplies the DC current DC1 and the voltage HVDC using a multiplier 702, subtracts a system loss from a result of the multiplication using a subtractor 703, and divides a result of the subtraction by the motor rotation speed SPD using a divider 704, thereby obtaining the first torque TQ_DC. The system loss is obtained by using a system loss characteristic map of "first torque and system loss" in which the torque limit on the x axis illustrated in FIG. 5(B) is replaced with the first torque TQ_DC.

Example 3 of the first torque calculation unit 114 will be described with reference to FIG. 7(C). FIG. 7(C) is a view illustrating the configuration of Example 3 of the first torque calculation unit 114. The configuration of Example 3 of the first torque calculation unit 114 is similar to that of the torque limit calculation unit 116 illustrated in FIGS. 6(A) and 6(B). Although the current limit DC_LMT1 is used in Example 3 of the torque limit calculation unit 116, but the DC current DC1 is used instead of the current limit DC_LMT1 in this example, which is a difference. The first torque calculation unit 114 multiplies the DC current DC1, the voltage HVDC, and the system efficiency using a multiplier 705, and divides a result of the multiplication by the motor rotation speed SPD using the divider 704, thereby obtaining the first torque TQ_DC. The system efficiency is obtained by using a system efficiency characteristic map of "first torque and system efficiency" in which the torque limit on the x axis illustrated in FIG. 6(B) is replaced with the first torque TQ_DC.

Figure 8A:
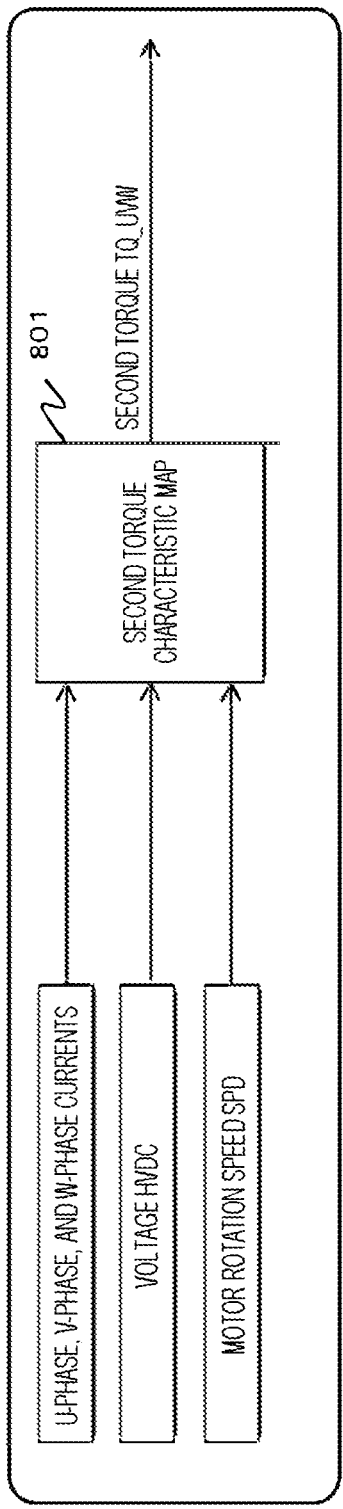
FIGS. 8(A) and 8(B) are views illustrating a second torque calculation unit.

Next, the second torque calculation unit 115 will be described. FIG. 8(A) is a view illustrating a configuration of the second torque calculation unit 115, and FIG. 8(B) is a view illustrating a second torque characteristic map 801.

In FIG. 8(A), U-phase, V-phase, and W-phase currents are currents detected from the phase current detector 105 connected to UVW phases between an AC side of the inverter 104 and the motor 106. A voltage HVDC is a voltage from a DC voltage sensor of the secondary battery 101. The motor rotation speed SPD is a rotation speed of the motor calculated from the angle sensor 107.

Figure 8B:
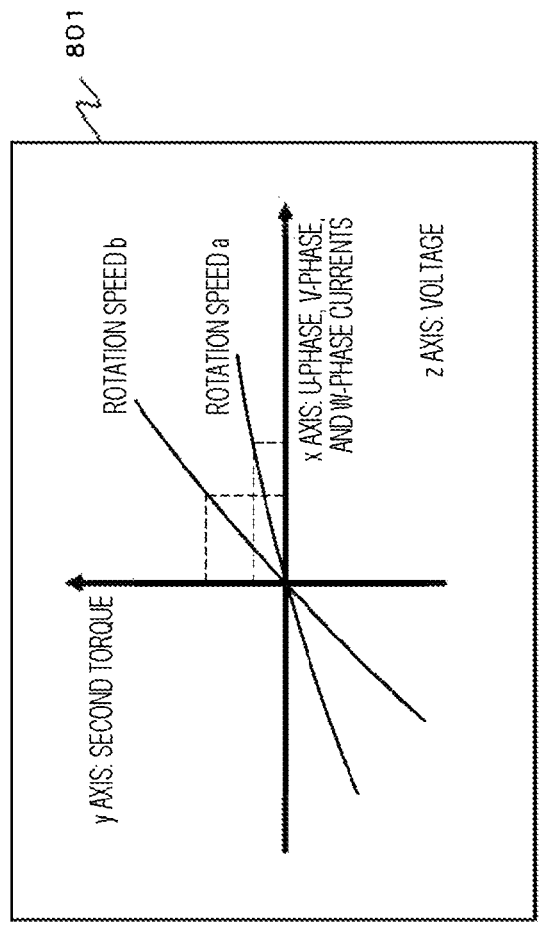

The second torque characteristic map 801 illustrated in FIG. 8(B) is a map illustrating the relationship between the "U-phase, V-phase, and W-phase currents and second torque" measured in an experiment. As illustrated in FIG. 8(B), an x axis represents the U-phase, V-phase, and W-phase currents, a y axis represents the second torque TQ_UVW, and a z axis represents the voltage HVDC.

Note that a graph on the z axis is omitted, but the relationship between the U-phase, V-phase, and W-phase currents on the x axis and the second torque TQ_UVW on the y axis illustrated in FIG. 8(B) is defined according to the motor rotation speed SPD (rotation speed a, b, and so on) for each value of the voltage HVDC. The second torque calculation unit 115 can obtain specific second torque TQ_UVW from the y axis for a specific motor rotation speed SPD when the value on the z axis is determined according to the voltage HVDC and the U-phase, V-phase, and W-phase currents are input to the x axis.

Note that the second torque TQ_UVW may be obtained by a torque equation expressed in the following Formula (1).
[Formula 1]

$$T = Pn \cdot \{\Phi \cdot Ia \cdot \cos\beta + (Ld - Lq) \cdot Ia^2 \cdot \sin 2\beta\} \quad (1)$$

Here, $\Phi$ is an interlinkage magnetic flux, Pn is the number of pole pairs, Ld and Lq are inductances of the motor 106, Ia is the U-phase, V-phase, and W-phase currents, and $\beta$ is a current phase angle. The current phase angle is a phase angle of the motor 106 calculated from the angle sensor 107. The interlinkage magnetic flux, the number of pole pairs, and the inductance are default parameters of the motor 106.

The torque limit correction unit 117 receives input of the torque limit TQ_LMT1 from the torque limit calculation unit 116, the first torque TQ_DC from the first torque calculation unit 114, and the second torque TQ_UVW from the second torque calculation unit 115.

The torque limit correction unit 117 compares the first torque TQ_DC with the second torque TQ_UVW to estimate a variation degree of a product. The variation degree is calculated from the following Formula (2). The torque limit TQ_LMT1 is corrected using this variation degree, and the corrected torque limit TQ_LMT2 is calculated by the following Formula (3).

$$\text{Variation degree} = \text{Second torque TQ\_UVW} / \text{First torque TQ\_DC} \quad (2)$$

$$\text{torque limit TQ\_LMT2} = \text{torque limit TQ\_LMT1} \times \text{Variation degree} \quad (3)$$

Note that it is necessary to set calculation cycles of the first torque calculation unit 114, the second torque calculation unit 115, and the torque limit correction unit 117 to be sufficiently fast in order to ensure the responsiveness of the torque correction operation. There is a detection delay in the DC current DC1 required to obtain the first torque TQ_DC or the U-phase, V-phase, and W-phase currents required to obtain the second torque TQ_UVW. Further, there is also a calculation delay in the first torque calculation unit 114 and the second torque calculation unit 115. Therefore, it is necessary to perform appropriate synchronization by Formula (2) and Formula (3) according to the variation degree.

A vehicle controller 110 is a host controller that transmits required torque TQ_COM for acceleration and deceleration or cranking. The vehicle controller 110 calculates the required torque TQ_COM with the torque limit TQ_LMT2 received from the torque limit correction unit 117 as a limit, and outputs the required torque TQ_COM to the current command calculation unit 111.

FIGS. 9(A) to 9(C) are graphs illustrating characteristics of the motor control device according to the present embodiment. FIG. 9(A) illustrates the torque of the motor, FIG. 9(B) illustrates the DC current DC1, FIG. 9(C) illustrates the rotation speed of the motor, and all horizontal axes represent the elapsed time.

As illustrated in FIG. 3, the secondary battery 101 calculates the available current limit DC_LMT1 from a temperature and a remaining capacity. The torque limit calculation unit 116 calculates the torque limit TQ_LMT1 based on the current limit DC_LMT1 and the like. Here, as illustrated in FIG. 9(A), the required torque TQ_COM determined based on accelerator opening information by a driver reaches the torque limit TQ_LMT2. At this time, the DC current DC1 does not overshoot beyond the current limit DC_LMT1, the torque limit TQ_LMT2 does not change suddenly, either, and the DC current can approach the current limit DC_LMT1. As a result, the output of the motor can be fully utilized.

FIGS. 10(A) to 10(E) are graphs illustrating detailed characteristics of the motor control device according to the present embodiment. FIG. 10(A) illustrates the torque of the motor, FIG. 10(B) illustrates the DC current DC1, FIG. 10(C) illustrates the torque, FIG. 10(D) illustrates the variation degree, FIG. 10(E) illustrates the rotation speed of the motor, and all horizontal axes represent the elapsed time.

The torque limit TQ_LMT1 illustrated in FIG. 10(A) is a torque limit calculated based on the current limit DC_LMT1 and using the torque limit characteristic map 401 of the "current limit and torque limit". The torque limit TQ_LMT2 is a torque limit obtained by correcting the torque limit TQ_LMT1 using the variation degree KP1. The required torque TQ_COM is required torque determined based on the accelerator opening information by the driver, and is limited to the torque limit TQ_LMT2.

The current limit DC_LMT1 illustrated in FIG. 10(B) is an available DC limit value calculated from a temperature and a remaining capacity of the secondary battery 101. The DC current DC1 is a detection value or an estimation value of a current input to the inverter 104. As illustrated in FIG. 10(B), the DC current DC1 does not overshoot beyond the current limit DC_LMT1.

The first torque TQ_DC illustrated in FIG. 10(C) is drive torque of the motor estimated based on the DC current DC1 using the first torque characteristic map 701 of the "DC current DC1 and first torque" and the like. The second torque TQ_UVW is drive torque of the motor estimated based on the U-phase, V-phase, and W-phase currents flowing through the motor using the second torque characteristic map 801 of the "U-phase, V-phase, and W-phase currents and second torque" and the like. Since the second torque TQ_UVW has passed through the inverter 104, the torque becomes lower than the first torque TQ_DC due to the loss.

The variation degree KP1 illustrated in FIG. 10(D) represents a variation degree of a product estimated by comparing the second torque TQ_UVW and the first torque TQ_DC.

The motor rotation speed SPD illustrated in FIG. 10(E) is a rotation speed of the motor calculated from the angle sensor 107.

Next, an additional function of the torque limit correction unit 117 will be described with reference to FIGS. 11(A) to 11(F).

The DC current DC1 or the U-phase, V-phase, and W-phase currents has the detection delay, and the first torque calculation unit 114 and the second torque calculation unit 115 have the calculation delay, and thus, there is a possibility that the responsiveness of the torque limit correction by the torque limit correction unit 117 deteriorates. Alternatively, when the vehicle accelerates suddenly and there is not enough time for the torque limit correction, the DC current DC1 is likely to exceed the current limit DC_LMT1 within a short period of time.

Therefore, when the DC current DC1 exceeds the current limit DC_LMT1, the torque limit correction unit 117 lowers the corrected torque limit TQ_LMT2 by current feedback control to calculate a final torque limit TQ_LMT2'.

Figure 11A:
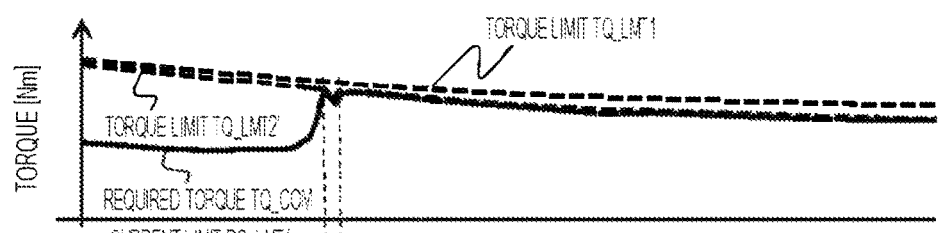
FIGS. 11(A) to 11(F) are views for describing an additional function of a torque limit correction unit.
Figure 11B:
Figure 11C:
Figure 11D:
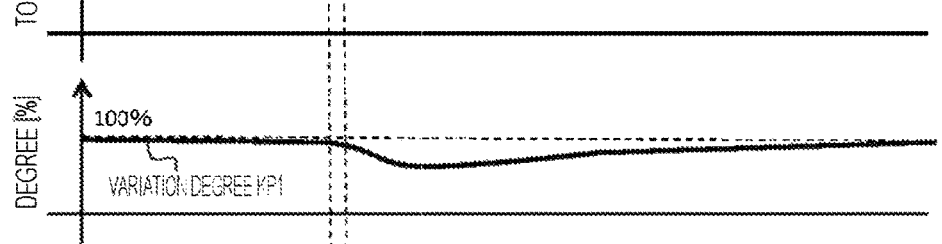
Figure 11E:
Figure 11F:

FIGS. 11(A) to 11(F) are graphs illustrating detailed characteristics of the motor control device when the additional function is added to the torque limit correction unit 117. FIG. 11(A) illustrates the torque of the motor, FIG. 11(B) illustrates the DC current DC1, FIG. 11(C) illustrates the torque, FIG. 11(D) illustrates the variation degree, FIG. 11(E) illustrates feedback torque TQ_FB1, FIG. 11(F) illustrates the rotation speed of the motor, and all horizontal axes represent the elapsed time.

As illustrated in FIG. 11(A), the torque limit TQ_LMT1 is a torque limit calculated based on the current limit DC_LMT1 and using the torque limit characteristic map 401 of the "current limit and torque limit". The torque limit TQ_LMT2 is a torque limit obtained by correcting the torque limit TQ_LMT1 using the variation degree KP1. The torque limit TQ_LMT2' is a final torque limit obtained by subtracting the feedback torque TQ_FB1 from the corrected torque limit. The required torque TQ_COM is required torque determined based on the accelerator opening information by the driver, and is limited to the torque limit TQ_LMT2'.

The current limit DC_LMT1 illustrated in FIG. 11(B) is an available DC limit value calculated from a temperature and a remaining capacity of the secondary battery 101. The DC current DC1 is a detection value or an estimation value of a current input to the inverter 104.

The first torque TQ_DC illustrated in FIG. 11(C) is drive torque of the motor estimated based on the DC current DC1 using the first torque characteristic map 701 illustrating the relationship between the "DC current DC1 and first torque" and the like. The second torque TQ_UVW is drive torque of the motor estimated based on the U-phase, V-phase, and W-phase currents flowing through the motor using the second torque characteristic map 801 illustrating the relationship between the "U-phase, V-phase, and W-phase currents and second torque" and the like.

The variation degree KP1 illustrated in FIG. 11(D) is a variation degree of a product estimated by comparing the second torque TQ_UVW and the first torque TQ_DC. The variation degree is a case where the response speed is insufficient due to the detection delay in the DC current DC1 or the U-phase, V-phase, and W-phase currents, the calculation delay in the first torque calculation unit 114 and the second torque calculation unit 115, or the sudden acceleration of the vehicle.

The feedback torque TQ_FB1 illustrated in FIG. 11(E) is reduced torque generated by current feedback control such that the DC current DC1 does not exceed the current limit DC_LMT1 when exceeding the current limit DC_LMT1. The current feedback control is provided as the additional function in the torque limit correction unit 117.

The motor rotation speed SPD illustrated in FIG. 11(F) is a rotation speed of the motor calculated from the angle sensor 107.

In this manner, when the DC current DC1 exceeds the current limit DC_LMT1 after the required torque TQ_COM reaches the torque limit TQ_LMT2, the feedback torque TQ_FB1 is subtracted from the torque limit TQ_LMT2 to obtain the final torque limit TQ_LMT2', thereby reducing the overshoot time of the DC current.

According to the above-described embodiment, the following operational effects are obtained.

(1) The motor control device includes: the inverter 104 which supplies the U-phase, V-phase, and W-phase currents to the motor 106; the torque limit calculation unit 116 which calculates the torque limit from the current limit of the secondary battery 101 that supplies DC current to the inverter 104; the first torque calculation unit 114, which calculates the first torque based on the DC current supplied to the inverter 104; the second torque calculation unit 115 which calculates the second torque based on the U-phase, V-phase, and W-phase currents; and the torque limit correction unit 117 which corrects the torque limit using the first torque and the second torque. As a result, even if required torque reaches the torque limit, the DC current does not exceed the current limit, and the output of the motor can be fully utilized by approaching the current limit.

Note that the motor control device mounted on and used in the hybrid electric vehicle has been described as an example in the above embodiment, but the present invention is not limited thereto. For example, the present invention may be applied to a motor control device used by being mounted on a pure electric vehicle that does not use an engine, a motor control device used for an industrial motor, or the like. Any motor control device that controls a motor using a secondary battery is included in the scope of the present invention.

The present invention is not limited to the above-described embodiment, and other modes, which are conceivable inside a scope of a technical idea of the present invention, are also included in a scope of the present invention as long as characteristics of the present invention are not impaired.

REFERENCE SIGNS LIST

101 secondary battery
102 contactor
103 smoothing capacitor
104 inverter
105 phase current detector
106 motor
107 angle sensor
108 clutch
109 engine
110 vehicle controller
111 current command calculation unit
112 current control unit
113 DC current sensor
114 first torque calculation unit
115 second torque calculation unit
116 torque limit calculation unit
117 torque limit correction unit

The invention claimed is:

1. A motor control device comprising:
   an inverter which supplies U-phase, V-phase, and W-phase currents to a motor;
   a torque limit calculation unit which calculates a torque limit from a current limit of a secondary battery that supplies a DC current to the inverter;
   a first torque calculation unit which calculates first torque based on the DC current supplied to the inverter;
   a second torque calculation unit which calculates second torque based on the U-phase, V-phase, and W-phase currents; and
   a torque limit correction unit which corrects the torque limit using the first torque and the second torque,
   wherein the torque limit correction unit decreases the corrected torque limit by current feedback control when the DC current input to the inverter exceeds the current limit.

2. The motor control device according to claim 1, wherein the torque limit calculation unit includes a torque limit characteristic map in which a relationship between the current limit and the torque limit is defined in advance, and refers to the torque limit characteristic map based on the current limit, a voltage of the secondary battery, and a rotation speed of the motor to obtain the torque limit.

3. The motor control device according to claim 1, wherein the torque limit calculation unit includes a system loss characteristic map in which a relationship between the torque limit and a system loss is defined in advance, refers to the system loss characteristic map based on the torque limit to obtain the system loss, and obtains the torque limit based on the obtained system loss, the current limit, a voltage of the secondary battery, and a rotation speed of the motor.

4. The motor control device according to claim 1, wherein the torque limit calculation unit includes a system efficiency characteristic map in which a relationship between the torque limit and a system efficiency is defined in advance, refers to the system efficiency characteristic map based on the torque limit to obtain the system efficiency, and obtains the torque limit based on the obtained system efficiency, the current limit, a voltage of the secondary battery, and a rotation speed of the motor.

5. The motor control device according to claim 1, wherein the first torque calculation unit includes a first torque characteristic map in which a relationship between a DC current input to the inverter and the first torque is defined in advance, and refers to the first torque characteristic map based on the DC current, a voltage of the secondary battery, and a rotation speed of the motor to obtain the first torque.

6. The motor control device according to claim 1, wherein the first torque calculation unit includes a system loss characteristic map in which a relationship between the first torque and a system loss is defined in advance, refers to the system loss characteristic map based on the first torque to obtain the system loss, and obtains the first torque based on the obtained system loss, a DC current input to the inverter, a voltage of the secondary battery, and a rotation speed of the motor.

7. The motor control device according to claim 1, wherein the first torque calculation unit includes a system efficiency characteristic map in which a relationship between the first torque and a system efficiency is defined in advance, refers to the system efficiency characteristic map based on the first torque to obtain the system efficiency, and obtains the first torque based on the obtained system efficiency, a DC current input to the inverter, a voltage of the secondary battery, and a rotation speed of the motor.

8. The motor control device according to claim 1, wherein the second torque calculation unit includes a second torque characteristic map in which a relationship between the U-phase, V-phase, and W-phase currents and the second torque is defined in advance, and refers to the second torque characteristic map based on the U-phase, V-phase, and W-phase currents, a voltage of the secondary battery, and a rotation speed of the motor to obtain the second torque.

9. The motor control device according to claim 1, wherein the second torque calculation unit obtains the second torque from a following torque equation:

$$T = Pn \cdot \{\Phi \cdot Ia \cdot \cos\beta + (Ld - Lq) \cdot Ia^2 \cdot \sin 2\beta\} \quad \text{[Formula 1]}$$

($\Phi$ is an interlinkage magnetic flux, Pn is a number of pole pairs, Ld and Lq are inductances of the motor, Ia is the U-phase, V-phase, and W-phase currents, and $\beta$ is a current phase angle).

10. A motor control device comprising:
    an inverter which supplies U-phase, V-phase, and W-phase currents to a motor;
    a torque limit calculation unit which calculates a torque limit from a current limit of a secondary battery that supplies a DC current to the inverter;
    a first torque calculation unit which calculates first torque based on the DC current supplied to the inverter;
    a second torque calculation unit which calculates second torque based on the U-phase, V-phase, and W-phase currents; and
    a torque limit correction unit which corrects the torque limit using the first torque and the second torque,
    wherein the torque limit correction unit divides the second torque by the first torque and multiplies a result of the division by the torque limit to correct the torque limit.

* * * * *